J. O. CALDWELL, Jr.
SAFETY GRIP.
APPLICATION FILED NOV. 22, 1911.
1,275,217. Patented Aug. 13, 1918.
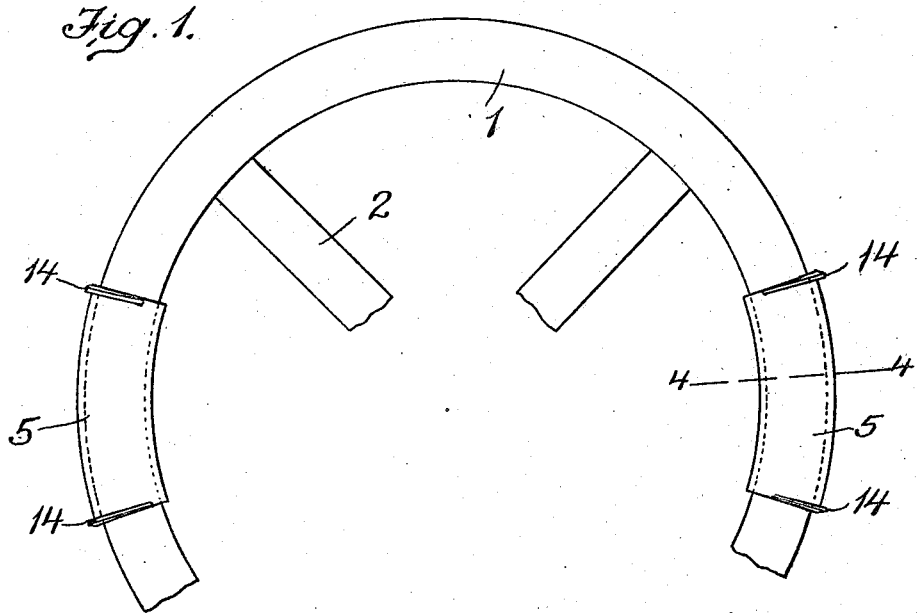
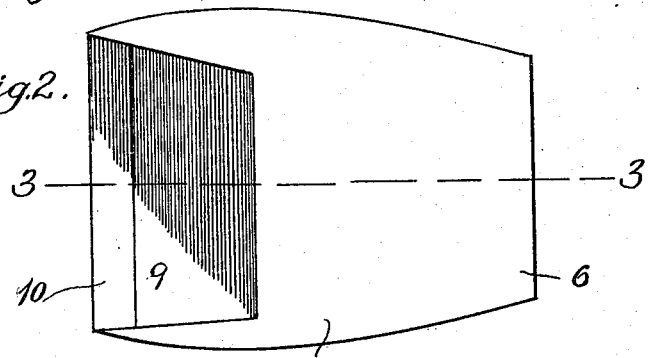
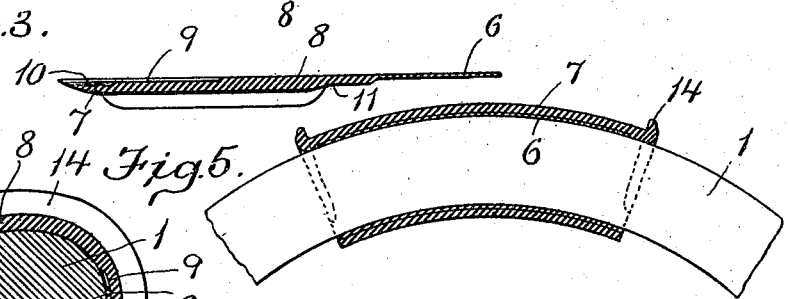
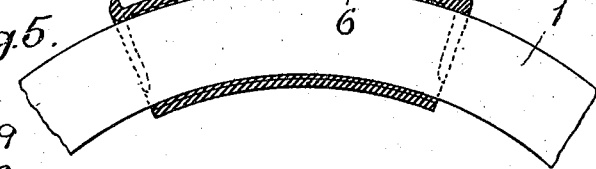
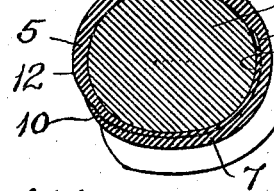
Inventor:
J. O. Caldwell Jr.

ll
UNITED STATES PATENT OFFICE.

JOHN O. CALDWELL, JR., OF BOSTON, MASSACHUSETTS.

SAFETY-GRIP.

1,275,217.  Specification of Letters Patent. Patented Aug. 13, 1918.

Application filed November 22, 1911. Serial No. 661,855.

*To all whom it may concern:*

Be it known that I, JOHN O. CALDWELL, Jr., of Boston, in the county of Suffolk and State of Massachusetts, have invented certain new and useful Improvements in Safety-Grips, of which the following is a specification.

The present invention relates to a shiftable grip adapted to be placed upon hand wheels or other elements intended to be gripped by a person's hand for the purpose of giving a firm non-slipping grip, but which can readily be shifted into various positions. The use which I have had particularly in mind in developing the invention is in connection with the steering wheel of automobiles, which frequently must be gripped firmly enough to prevent slipping between the hand and the wheel, and of which the gripping point is frequently shifted. Accordingly I have invented a gripping sleeve which can be placed on the rim of such a wheel, can be shifted easily to the points where the wheel is gripped, and can be caused at need to bind tightly upon the wheel and thereby form such a tight frictional grip as absolutely to prevent slipping. Another object has been to make such a sleeve capable of being placed on the rim of a wheel, which ordinarily is a complete ring or hoop, at any point desired, and which will not become dislodged by the vibrations imparted to the wheel when the vehicle of which the wheel is a part is in rapid motion. With these ends in view I have made a gripping sleeve having the principles and characteristics set forth in the following specification and claims, and substantially as shown in the accompanying drawings forming a part of this application. In the drawings, Figure 1 represents a partial plan view of a steering wheel having two of the hand grips or gripping sleeves thereon.

Fig. 2 represents a development of the sleeve and shows the interior thereof.

Fig. 3 shows a section on line 3—3 of Fig. 2.

Fig. 4 is a cross-section of the gripping sleeve in place upon a wheel rim.

Fig. 5 is a longitudinal section of the gripping sleeve.

The same reference characters indicate the same parts in all the figures.

In the drawings 1 represents the rim of a wheel, such as the steering wheel of an automobile. Such rim is usually made as a complete ring or hoop having an oval or elliptical cross section and secured to a number of arms 2 which radiate from the steering base. As is well known these wheel rims are usually made of hard wood having a smooth finish. They are consequently somewhat slippery, particularly when wet, and there is liability of the hands of the driver slipping thereon when attempting to turn the wheel quickly. Accidents have sometimes occurred from this cause where the slipping of the hands of the driver on the wheel have prevented the car from being diverted quickly enough to avoid danger. It is my object to eliminate danger from this cause by providing a gripping device which has a high co-efficient of friction both in contact with the wheel and with the hand of the driver.

My invention consists of a sleeve capable of being opened lengthwise so that it may be slipped on and off of a wheel rim of the character indicated, and so made further that it can be caused to bind upon the wheel very tightly. Further, in order to give it the necessary frictional qualities, it is preferably made in large degree of rubber. Two of the sleeves are represented at 5 as applied to the wheel, showing their appearance in side view. As shown in the sectional view (Fig. 4) each sleeve more than completely surrounds the wheel rim and has portions overlapping through a considerable proportion of the transverse circumference of the rim, these overlapping parts being indicated at 6 and 7 in Fig. 4.

The sleeve is preferably made of rubber strengthened by textile fabric vulcanized in it. A portion 8 of the sleeve sufficient in extent to surround the wheel rim is given body enough to cause it to retain its molded shape, very nearly approximating the shape and size of the rim itself, but sufficiently larger than the latter to fit freely thereon and be readily moved. At one edge of the body portion 8 is a flap which forms the overlapping member 6 previously referred to. This flap is thin and flexible, and when the grip is placed on the wheel lies in a shallow recess 9 formed in the body, as shown best in Figs. 2 and 3. The edge of the body 8 which overlaps the flap 6 is beveled to a thin edge which is adapted to occupy a shallow recess 10 in the external face of the body 8 near the point of union thereof with the flap 6. Thus when the sleeve is placed on the wheel it forms in effect a wrapping passing more than completely around the rim and having practically smooth internal and external surfaces. The flap 6 occupies the recess 9 which is equal in depth to the thickness of the flap, so that the inner face of the flap becomes flush with the inner face of the body part. The external surface of the grip is likewise practically smooth, owing to the close fit which the beveled edge 10 may make in the external recess 1. Thus the grip is adapted to fit smoothly outside of the wheel rim and within the hand of the user.

In placing the grip on the wheel, the grip is opened and slipped over the wheel rim, being then allowed to close when released, owing to its resilience. The flap 6 is tucked under the overlying part 7. The grip is so proportioned with relation to the wheel rim that it is spread open somewhat, the end of the lip 6 not extending quite to the inner end of the recess 9, and the scarfed joint between the edge 10 and the recess 11 not being quite closed. As the material of which the grip is made has enough stiffness to maintain its molded sleeve-like form, it remains on the wheel without extraneous aid, but does not of itself grip the wheel with too much firmness to permit of its being easily shifted. When it becomes necessary to secure a firm grip on the wheel, the driver need only twist the grip around the wheel rim in the direction which tends to move the scarfed edge 10 toward the point 12 shown in Fig. 4, whereupon the portion 7 slides upon the flap 6 and the sleeve is caused to bind upon the wheel rim. The entire inner surface of the grip thus bears upon the wheel with as great a pressure as necessary, and owing to the frictional qualities of the material, slipping is impossible. At the same time a grip externally on the sleeve sufficiently firm to cause it to bind on the wheel rim prevents slipping between the hand of the driver and the grip itself. Thus the driver is enabled to get a firm grasp on the wheel, no matter how slippery it may be, without exerting any great muscular force. As an additional precaution against slipping of the hand from the grip, the latter may be provided with outwardly projecting beads or lips 14 on its ends, although these beads are not essential, and may be omitted without departing from the spirit of the invention. In practice two grips are ordinarily provided upon one wheel for the two hands. In order to clasp or unclasp the grips upon the wheel it is only necessary to turn the hand slightly around the wheel rim in the manner which one naturally and instinctively employs. The mere act of turning the wheel causes one of the hands gripping it to move away from the body, and in so moving the hand has a tendency to turn slightly around the wheel in the direction which tends to tighten the gripping member on the wheel. Thus in an emergency, when a quick change in the course of the car is necessary, the natural and instinctive movements of the driver in turning the wheel to effect this purpose, tighten the grips on the wheel and thus naturally guard against slipping. When released the grips can be shifted with the greatest ease into the most convenient positions on the wheel. The grips oppose a degree of resistance to opening sufficient to insure their retention on the wheel under conditions of the greatest vibration to which a car rapidly running over a rough road is subject. There is no danger of the grips falling from the wheel when the grasp upon them is relinquished.

It will be appreciated from the foregoing that the grip is in effect a wrapping of flexible material having sufficient length to extend more than entirely around the body on which it is mounted, which is molded into the form of a sleeve and has sufficient resilience to retain its molded shape. In other words it is a sleeve divided longitudinally with a flap extending from one part at the line of division within and beneath the adjacent part. Such sleeve normally retains a shape fitting easily the article to which it is applied, but can be distorted from this shape with slight exertion sufficiently to be stripped from or applied to the wheel or other object.

Although I have described the hand grip in connection with a wheel I wish it to be understood that such a wheel is merely one article typical of the many diverse things upon which the grip may be placed. For instance it might be made to fit a straight rod, or a rope, a guard rail, or other object which at times must be firmly gripped by the hand and upon which it is desirable or necessary to shift the grip.

I claim,—

1. A friction grip consisting of a wrapping of frictional material shaped to fit the object upon which it is to be applied and of length sufficient to more than entirely surround the object, having a flap at one edge and a recess in the inner face extending from the opposite edge to receive such flap, and being at the same time flexible, whereby it may be turned about the object and thereby tightened thereupon.

2. A hand grip for steering wheels and the like, comprising a sheet of rubber composition molded into sleeve form and curved longitudinally to fit the transverse and longitudinal curvatures of such wheel rim, said sheet being of greater length than required for a complete wrapping about the wheel rim, and having in one end a shallow recess adapted to receive and overlie the other end of the sheet, the material on the inner surface of the sheet at each end of the recess being arranged to bear on the wheel rim.

In testimony whereof I have affixed my signature, in presence of two witnesses.

JOHN O. CALDWELL, Jr.

Witnesses:
ARTHUR H. BROWN,
P. W. PEZZETTI,

Copies of this patent may be obtained for five cents each, by addressing the "Commissioner of Patents, Washington, D. C."